INVENTORS:
Robert M. Beck
Donald W. Fuller
Peter McAfee
Emil Ruhman
By Smyth, Roston & Pavitt
Attorneys

CONVERTER

Filed April 14, 1961

INVENTORS:
Robert M. Beck
Donald W. Fuller
Peter McAfee
Emil Ruhman
By Smyth, Roston & Pavitt
Attorneys.

May 4, 1965 R. M. BECK ETAL 3,182,304

CONVERTER

Filed April 14, 1961

4 Sheets-Sheet 3

INVENTORS:
Robert M. Beck
Donald W. Fuller
Peter McAfee
Smil Ruhman

By Smyth, Roston & Pavitt
Attorneys.

INVENTORS:
Robert M. Beck
Donald W. Fuller
Peter McAfee
Emil Ruhman

By Smyth, Roston & Pavitt
Attorneys.

3,182,304
CONVERTER

Robert M. Beck, Los Angeles, Donald W. Fuller, Pacific Palisades, Peter McAfee, Winnetka, and Smil Ruhman, Los Angeles, Calif., assignors, by mesne assignments, to Raytheon Company, Lexington, Mass., a corporation of Massachusetts Filed Apr. 14, 1961, Ser. No. 103,099
8 Claims. (Cl. 340—347)

This invention relates to converters and, more particularly, to apparatus for providing a conversion between digital and analog information. The invention is especially advantageous because it provides conversions at very high speeds and with accuracies considerably greater than those previously attained.

In recent years, considerable strides have been made in the development and production of equipment for performing computations and for providing controls in accordance with such computations. These developments have constituted considerable advances toward an age of automation. Some of these computers provide computations in digital form such that the values of a quantity are represented by individual pluralities of signals. Such equipments are known as digital computers. Other computers operate on whole numbers so as to provide voltages having amplitudes directly proportional to the numbers. Such equipments are known as "analog computers."

It is often necessary to provide a conversion between analog and digital values in conjunction with the operation of such computers. For example, the operation of a digital computer may be controlled by certain measurements which may be made in analog form such as by voltages having amplitudes representing the measurements. By way of illustration, measurements of temperature and humidity may be made and may be indicated by voltages having amplitudes directly proportional to the values of the temperature and humidity. The values of these quantities have to be introduced to the computer for combination in certain mathematical relationships to obtain a desired result. In order for the digital computer to use this information properly, the voltages have to be converted to a plurality of signals indicating the amplitude of the voltage in digital form.

In a specific illustrative embodiment of this invention, a high speed analog-to-digital converter is provided. An analog-to-digital converter is a device which accepts instantaneous values of variable quantities and expresses these values in discrete numerical form. In general, an electronic converter of this type periodically samples the instantaneous amplitude of an analog input signal and expresses the amplitude of the sample in the form of a set of digital signals or a count. One of the types of electronic analog-to-digital converters utilized in the prior art may be referred to as a "digit-at-a-time" converter, since the analog signal is converted to a set of digital signals, one binary digit at a time. One system of this general type is disclosed in the copending patent application Serial No. 737,697 filed by Robert M. Beck et al. on May 26, 1958, now Patent No. 3,077,303, dated February 12, 1963.

In the system described in the application by Robert M. Beck et al., the amplitude of the analog sample is compared with a standard voltage representing the magnitude of the highest order digit of the digital set. If the standard voltage is smaller than the sample, it is subtracted from the sample and the remainder is then compared with a standard voltage representing the next highest order digit. This process is continued until the lowest order or units digit is compared with the remainder of the sample and is determined to be either larger or smaller. Each time the standard voltage is found to be smaller than the sample, a binary 1 is registered, and each time the standard voltage is found to be larger than the sample, a binary 0 is recorded and the standard voltage is not subtracted from the sample. This method is referred to as a method of successive approximations.

Features of this invention relate to the provision of means for clearing the converter during the first bit time when the first digit is determined. Responsive to a start pulse, a clear signal is developed for resetting the register and a chain of control multivibrators is also operated for initiating the various control functions required during each digit determination. One such control function is the generation of a clamp drive pulse which enables the Schmidt trigger circuit in the comparator. Another function is the generation of a shift pulse for the magnetic shift register.

The operation of the control multivibrators may be automatically recirculated through gating means which is automatically disabled at the end of the conversion. During each circulation, another of the digits is determined. The digital information is provided serially, digit by digit, during the conversion and at the end of the conversion it may be provided in parallel.

In the specific illustrative embodiment of this invention, the method of successive approximations is utilized. The converter includes a comparator for comparing the internally generated, digitally controlled voltages with the input analog voltage. A Schmidt trigger circuit in the comparator determines whether the comparison error exceeds a predetermined value. A binary register is also provided having one stage for each digit of the digital number. A magnetic shift register is associated therewith for selecting the particular stage for determining its binary condition under control of the Schmidt trigger circuit.

The shift register may be externally controlled or it may be internally controlled responsive to a recirculation sequence. Features of this invention relate to the tuning flexibility afforded by the shift register. Further, the magnetic shift register utilizes relatively few components and, accordingly, the system reliability is improved.

Further features and advantages of this invention will become apparent upon consideration of the following description when read in conjunction with the drawing, wherein.

*General description*

Figure 1:
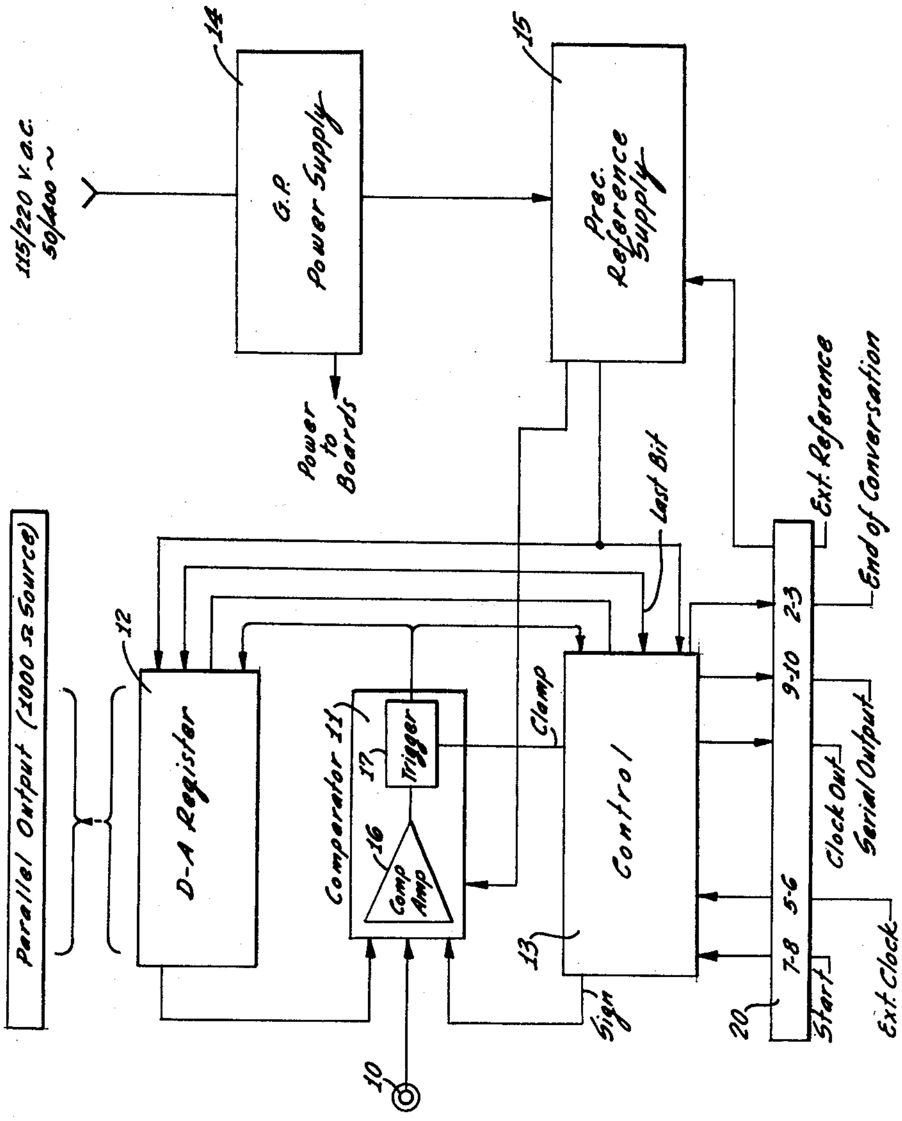
FIGURE 1 is a functional representation of the analog-to-digital converter of this invention.

Referring to FIGURE 1, which is a functional representation of the analog-to-digital converter of this invention, the input analog signal is introduced at a terminal 10 to a comparator 11. The comparator 11 compares the analog input signal with internally-generated, digitally-controlled signals developed by a register 12 and in a control circuit 13. Illustratively, the digital signal may be binary coded at eleven binary bits with the first bit or most significant bit being indicative of the polarity of the registered signal. The most significant bit, which is the sign bit, is provided from the control circuit 13 to the comparator amplifier 16 in the comparator 11.

The other ten bits are provided from the register 12 also to the comparator amplifier 16.

The conversion is accomplished by successive approximations with the digitized output valve representing the unknown input analog voltage to within half the value of the least significant bit (round-off error). The input analog voltage may be in the range between plus and minus ten volts and the converter then has an accuracy of ±0.05 percent ±½ of the least significant bit.

A start pulse through a terminal board 20 to the control circuit 13 indicates the analog-to-digital conversion. The conversion rate is at 10,000 per second for the eleven bit digital signals. Each bit is determined during 9 microseconds and additional intervals for clearing the register are not required. In other words, as one eleven bit conversion is completed, the next conversion at $1/10{,}000$ of a second later may be initiated.

Portions of the control circuit 13 and the register 12 form a magnetic core shift register arrangement which is operated responsive to the start pulse. The magnetic core shift register arrangement includes eleven stages and, as the successive magnetic cores are set, circuits are enabled for determining a respectively associated binary bit. As each core is set, its associated stage either in the control circuit 13 or in the register 12 is set therewith to change the input to the comparator amplifier 16 therefrom. If the signal to the trigger circuit 17 from the comparator amplifier 16 exceeds a predetermined value, the trigger circuit 17 operates and functions to reset the respective stage in either control circuit 13 or the register 12.

For example, consider that the input analog signal at the terminal 10 is positive, the start pulse sets the shift register to its first stage, which is in the control circuit 13, and a flip-flop associated therewith is also set. This flip-flop provides for a particular signal to the comparator amplifier 16. This signal is one of the internally-generated voltages mentioned above. The signal from the comparator amplifier 16 to the trigger circuit 17 is insufficient to operate it when the input analog signal is positive so that the stage (the sign bit stage) in the control circuit 13 is not reset. However, if the input analog signal is negative, the trigger circuit 17 is operated to reset the stage.

The successive operation of the control circuit 13 may be automatic from one binary bit to the next or it may be externally controlled by an external clock signal. The timing is, accordingly, quite flexible. As the successive stages in the register 12 are set, a serial output is developed which is provided from the control circuit 13 through the terminal board 20. At the end of the eleven bits, the recirculation or automatic conversion bit by bit, is halted and a parallel output may be read from the register 12. An indication of the end of conversion is also provided from the control circuit 13 through the terminal board 20.

The converter apparatus of this invention also includes two potential supplies: a power supply 14 which develops a 115 volt and a 220 volt alternating current signal which signals may have a frequency between 50 and 300 cycles per second. A precision reference supply 15 is also provided which develops accurate potentials and supplies them to the comparator 11, to the register 12 and to the control circuit 13. The power supplies 14 and 15 may be of conventional types and are not described here in detail.

A separate clearing time for the register 12 or of the sign bit stage in the control circuit 13 is not required because these circuits are automatically cleared during the first bit time. The magnetic core shift register associated with the flip-flops in the register 12 and control circuit 13 requires relatively few components and, accordingly, is highly reliable as well as flexible with regard to the tuning. The flip-flops serve as output buffers for storing the digitized information. As the bit is shifted along the magnetic register, each flip-flop is set by the pulse from the preceding stage of the magnetic register. It remains set only if the Schmidt trigger circuit is not triggered when enabled by a clock drive pulse from the control circuit. The control circuit develops a clock drive pulse and a shift pulse during each recirculation or bit.

*Detail description*

Figure 2:
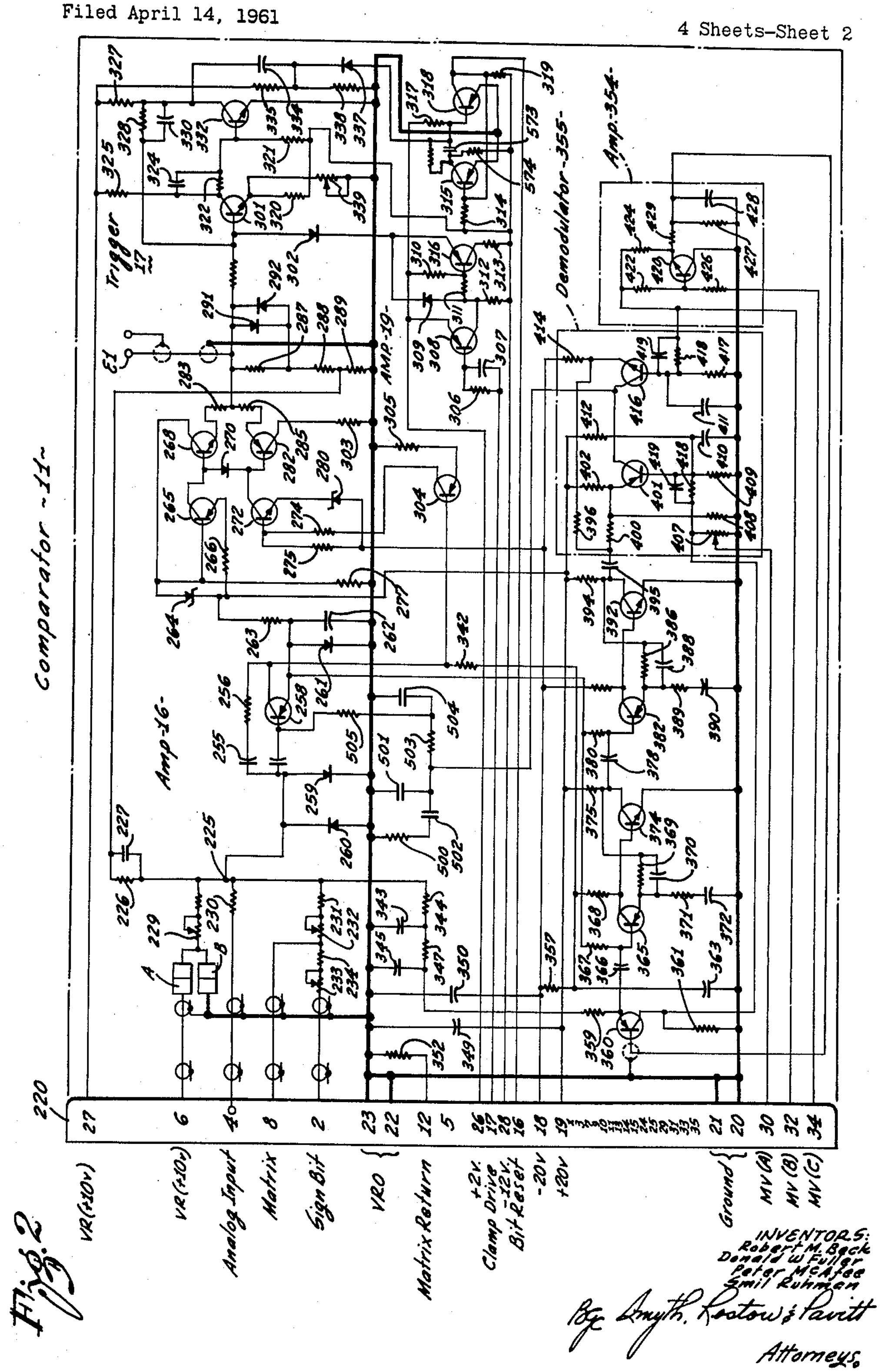
FIGURE 2 is a detail circuit diagram of the comparator utilized in the analog-to-digital converter of this invention.
Figure 3:
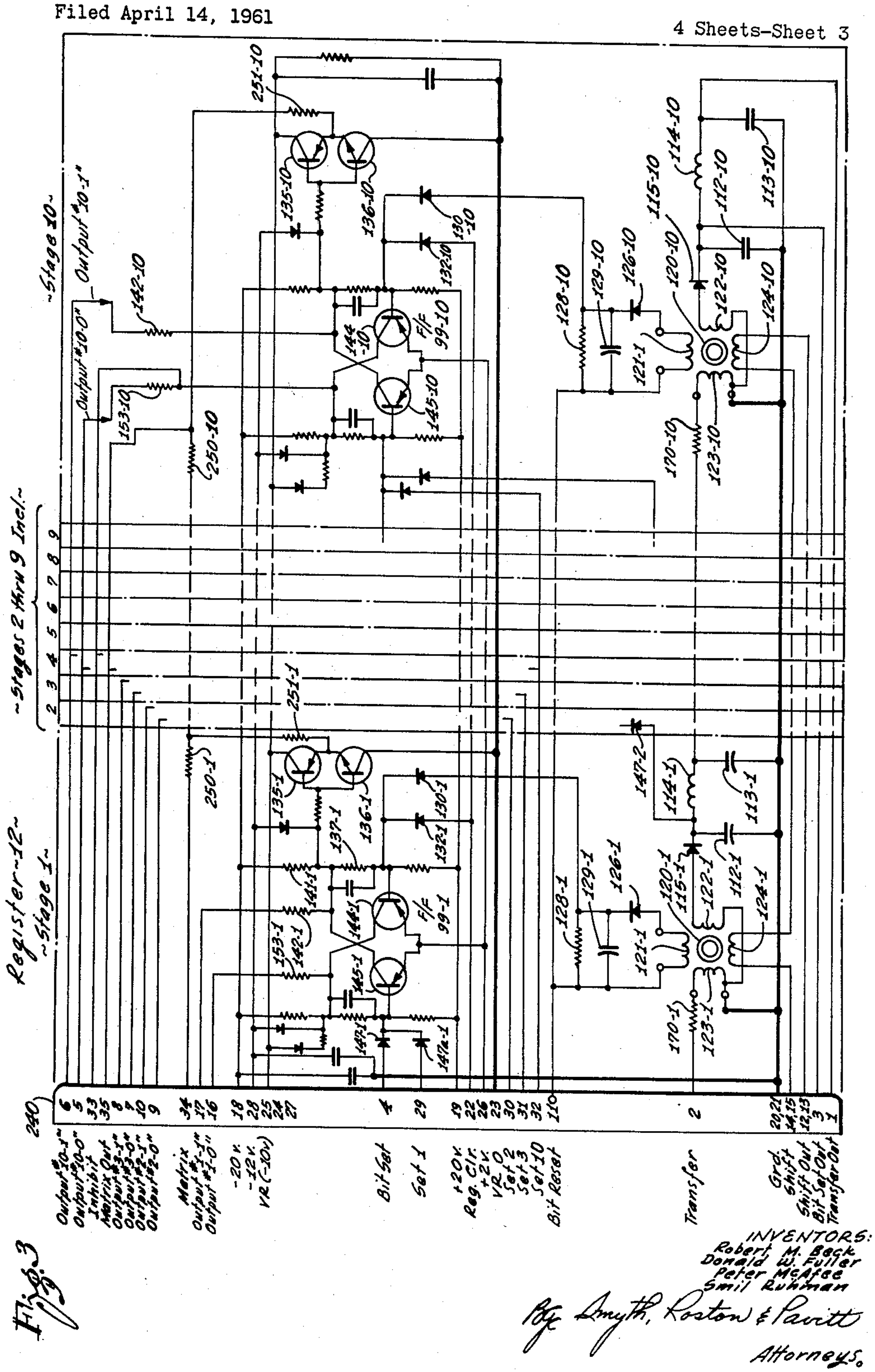
FIGURE 3 is a circuit representation of the register utilized in the analog-to-digital converter of this invention.
Figure 4:
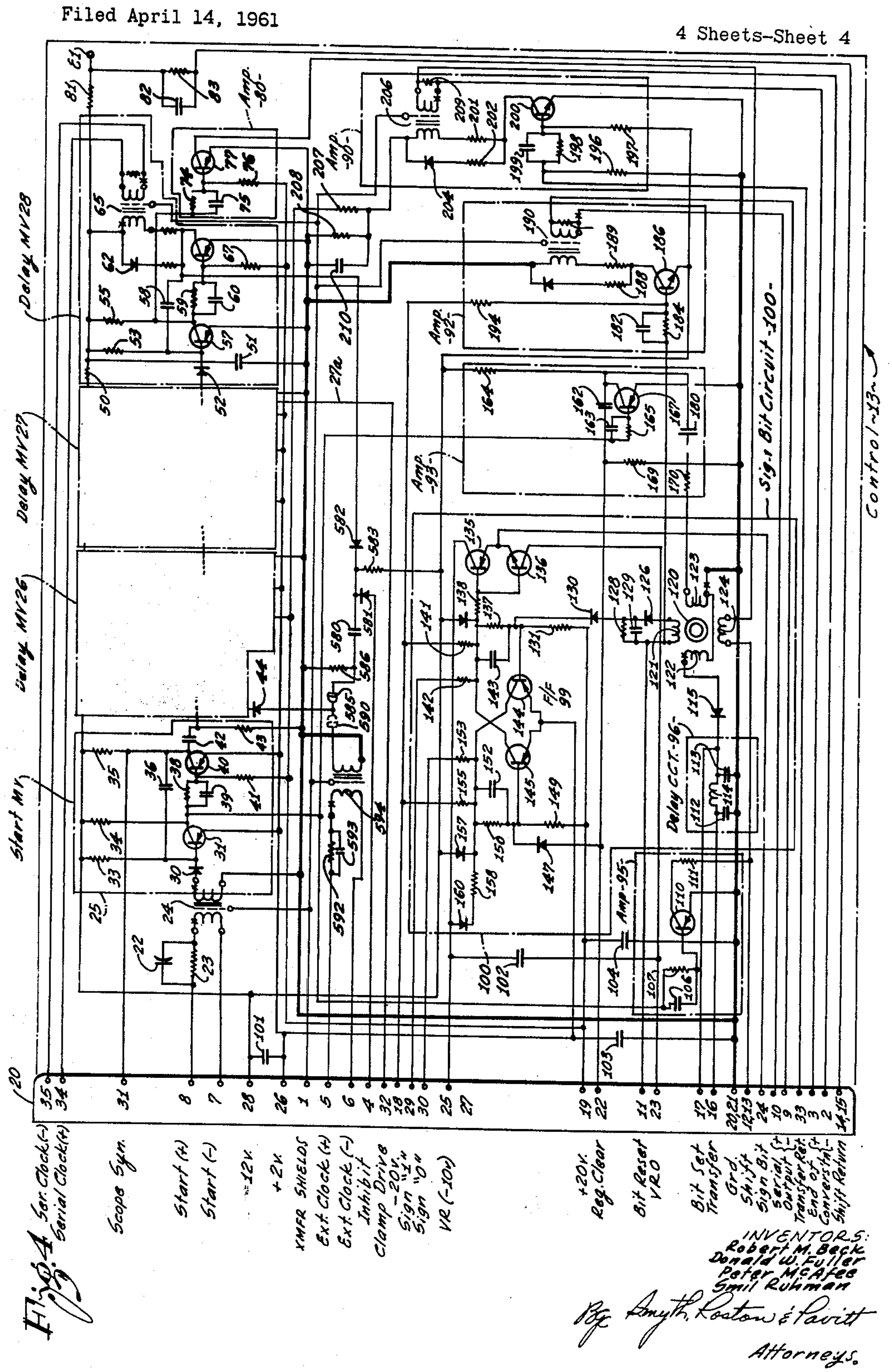
FIGURE 4 is a circuit diagram of the control arrangement utilized in the analog-to-digital converter of this invention.

Referring now to FIGURES 2 through 4, FIGURE 2 illustrates the comparator 11, FIGURE 3 illustrates the register 12 and FIGURE 4 illustrates the control circuit 13. The analog input is introduced to the comparator 11 in FIGURE 2 at terminal 4 of a terminal board 220. In the comparator 11, the analog input is introduced to a resistive summing network at the input of a transistor amplifier 16. As is hereinafter described in detail, the summing network includes a number of resistive components 228 through 234 to which signals are provided from register 12 in FIGURE 3 and the control circuit 13 in FIGURE 4.

The converter shown in FIGURES 2 through 4 employs a method of successive approximations in converting the input analog voltage to a binary digital number. This method proceeds by the successive comparison of internally-generated, digitally-controlled voltages with the unknown input analog voltages. The comparison takes place in the comparator 11 shown in FIGURE 2 and the digitally-controlled voltages are provided from the register 12 shown in FIGURE 3 and one voltage, the sign bit voltage, is provided from the control circuit 13. After, illustratively, 11 comparisons, the digitized output value represents the unknown analog voltage to within half the value of the least significant bit (round-off error).

Referring now to FIGURE 4, a start pulse is provided to the converter to initiate the converting operation to provide an 11 bit binary signal corresponding to the input analog voltage. The start pulse is provided to terminals 8 and 7 of a terminal board 20 in the control circuit 13 in FIGURE 4. The start pulse is coupled through a resistor 23, shunted by a capacitor 22, and through a transformer 24 to the start multivibrator 25. The resistor 23 may have a suitable value such as 3.3 kilohms and the capacitor 22 may have a suitable value such as 500 micromicrofarads.

The start multivibrator 25 is one of four substantially similar multivibrators 25 through 28 which are connected to form a chain of multivibrators in the control circuit 13. Each of the four multivibrators 25 through 28 performs specific functions in the operation of the analog-to-digital converter of this invention. For example, as is hereinafter described, the start multivibrator 25 generates a "clear" pulse for setting a sign bit circuit 100 in the control circuit 13 and for resetting ten stages 1 through 10 in the register 12 in FIGURE 3.

The multivibrator 25 is of a conventional type and includes two junction transistors 31 and 40. These transistors as well as the rest of the transistors shown in the control circuit 13 may be of the type designated 2N404. The input start pulse is coupled across the transformers 25 and provided through a diode 30 to the base electrode of the transistor 31. The diode 30, as well as other diodes shown in the control circuit 13 may be of the type designated 1N770. The emitter electrodes of the transistors 31 and 40 are coupled to a terminal 26 of the board 20 which may be at a potential of plus 2 volts. The collector electrode of the transistor 31 is coupled to the base electrode of the transistor 40 by a resistor 38 shunted by a capacitor 39. The resistor 38 may have a value of 5.6 kilohms and the capacitor 39 may have a value of 300 micromicrofarads. The base electrode of the transistor 40 is biased from terminal 28 of the board 20, at an illustrative potential of minus 12 volts, through the serially connected resistors 34, 38 and 41. The resistors 34 and 41 may have illustrative values of 820 ohms and 47 kilohms, respectively. The minus 12 volt potential is also provided through a resistor 33 to the base electrode of the transistor 31 and through a resistor 35 to the collector electrode of the transistor 40. The resistors 33 and 35 may have suitable values such as 22 kilohms and 820 ohms, respectively. The collector electrode of the transistor 40 is coupled back through a capacitor 36 to the base electrode of the transistor 31. The capacitor 36 may have a suitable value such as 360 micromicrofarads.

The "clear" pulse is developed at the collector electrode of the transistor 31 and provided to a pulse amplifier 95 at the lower left hand corner of FIGURE 4. More specifically, the clear pulse is introduced from the collector electrode of the transistor 31 in the multivibrator 25 to a base resistor 107 shunted by a capacitor 106. The resistor 107 may have a value of 33 kilohms and the capacitor 106 may have a value of 300 micromicrofarads. These components are connected to the base electrode of the PNP junction transistor 110 which is the amplifying element in the pulse amplifier 95.

The emitter electrode of the transistor 110 is connected directly to the ground potential terminals 20 and 21 of the board 20, and its collector electrode is connected through a resistor 111 having a magnitude of 560 ohms to the shift terminals 12 and 13 of the board 20 and also to a winding 124 magnetically coupled to a core 120 in the sign bit circuit 100. The sign bit circuit 100 is a composite binary registration arrangement which includes the magnetic core 120, a delay circuit 96 and a sign flip-flop 99. As is further hereinafter described, the condition of the flip-flop 99 is indicative of the polarity, either plus or minus, of the digital signal developed in the converter apparatus.

The pulse from the amplifier 95 to the winding 124 is a shift pulse. The hysteresis curve of the core 120, and a number of other similar cores in the register 12, are substantially rectangular so that the cores are effectively bistable or two-condition components. The pulse from the amplifier 95 functions as a shift pulse to the stages 1 through 10 of the register 12 causing the magnetic cores in the stages 221 through 231 to assume their reset conditions. The terminals 12 and 13 of the board 20 in FIGURE 4 are connected to the terminals 12 and and 13 of a board 240 in the register 12. The shift pulse to the terminals 12 and 13 of the board 240 in FIGURE 3 causes the magnetic cores 120–1 through 120–10 to reset. The various components in the stages 1 through 10 are essentially similar to the components in the sign bit circuit 100 and have been given similar reference resignations with the addition of a dash followed by a number indicating which of the ten stages 1 through 10 the component appears in. The core 120–1 is in the stage 1 and is similar to the core 120 in the sign bit circuit 100. The clear pulse from the start multivibrator 25 sets the magnetic core 120 in the circuit 100 and the shift pulse from the amplifier 95 resets the cores 120–1 through 120–10 in the register stages 1 through 10 of the register 12. The core 120 in the circuit 100 is set responsive to the operation of an amplifier 93 in the control circuit 13.

The clear pulse from the collector electrode of the transistor 31 in the start multivibrator 25 is also provided to the amplifier 93 as well as to the amplifier 95. More specifically, the clear pulse is provided through a resistor 165 shunted by a capacitor 163 to the base electrode of a transistor 167 in the amplifier 93. The resistor 165 may have a value of 15 kilohms and the capacitor 163 may have a value of 300 microfarads. The emitter electrode of the transistor 167 is connected to ground and its collector electrodes is coupled by resistor 164 to the minus 12 volt terminal 28 of the terminal board 20. The resistor 164 may have a suitable value such as 1.2 kilohms.

The amplified "clear" pulse is provided from the collector electrode of the transistor 167 through a capacitor 180 and a resistor 170 to the set winding 123 which is magnetically coupled to the core 120. The other terminal of the winding 123 is connected to the ground potential terminals 20–21 of the terminal board 20. The capacitor 80 may have a suitable value such as .02 microfarad and the resistor 170 may have a suitable value such as 330 ohms. In the absence of a pulse from the amplifier 93 to the set winding 123, the shift pulse developed by the amplifier 95 at the winding 124 causes the magnetic core 120 to assume its set instead of its reset condition. The set pulse is slightly delayed with respect to the shift pulse. The other ten magnetic cores 120–1 through 120–10 in the register 12 are at their reset conditions responsive to the shift pulse developed by the amplifier 95 and coupled through terminals 12 and 13 of the terminal boards 20 and 240. The return path for the shift pulse is through terminals 14 and 15 of the boards 240 and 20 to a resistor 83 shunted by a capacitor 82 at the upper right hand corner of FIGURE 4. The resistor 83 may have a value of 33 ohms and the capacitor 82 may have a value of .015 microfarad. The resistor 83 is connected to a terminal designated E1 which may be at a negative potential.

To briefly recapitulate, when the start multivibrator 25 is triggered responsive to the start pulse, it sets the magnetic core 20 in the sign bit circuit 100 and it clears or resets magnetic cores 120–1 through 120–10 in the stages 1 through 10 of the register 12. The start multivibrator 25 also functions to trigger the delay multivibrator 26 which is adjacent thereto in the chain of the four multivibrators 25 through 28 in the control circuit 13.

In addition to setting the magnetic core 120, the amplifier 93 also functions to set the flip-flop 99 in the sign bit circuit 100 and to reset the flip-flops 99–1 through 99–10 in the stages 1–10 of the register 12. The control pulse from the amplifier 93 is coupled through a capacitor 162 to the register clear terminal 22 of the terminal board 20 and also through a diode 147 to the base electrode of a transistor 145. The capacitor 162 is also coupled to the ground potential terminals 20 and 21 of the board 20 through a resistor 169 having a suitable value such as 516 kilohms. The capacitor 162 may have a value of .0047 microfarad.

The flip-flop 99 has two transistors 144 and 145 which are cross connected in a conventional manner. The emitter electrodes of the transistors 144 and 145 are interconnected and coupled by a capacitor 103 to the plus 2 volt terminal 26 of the terminal board 20. This terminal is shunted by a capacitor 103 to the ground potential terminals 20 and 21. The capacitor 103 may have a suitable value such as 25 microfarads. The base electrodes of the transistors 145 and 144 are connected respectively to junctions in voltage divider networks connected between the plus 20 volt terminal 19 of the board 20 and the minus 20 volt terminal 18 of the board 20. One divider arrangement includes the resistors 149, 150 and 155 and the other voltage divider arrangement includes the resistors 131, 137 and 141. The resistors 149, 150, 155, 131, 137 and 141 may respectively have suitable values such as 91 kilohms, 12 kilohms, 1.5 kilohms, 91 kilohms, 12 kilohms and 1.5 kilohms. The resistors 150 and 137 are respectively shunted by capacitors 152 and 143 having suitable values such as 100 micromicrofarads. The base electrode of the transistor 145 is connected to the junction of the resistors 149 and 150 and the base electrode of the transistor 144 is connected to the junction between the resistors 131 and 137. The positive pulse from the amplifier 93 through the diode 147 causes the transistor 145 to become nonconductive and, in turn, to cause the transistor 144 to become conductive. When the transistor 145 becomes nonconductive, it couples a negative pulse through the capacitor 143 to the base electrode of the transistor 144. The collector electrode of the transistor 145 is biased over a path from the minus 20 volt terminal 18 through a resistor 141 and the collector electrode of the transistor 144 is biased through a resistor 155.

The potential conditions at the collector electrodes of the transistors 144 and 145 are provided respectively through resistors 153 and 142 to the "sign" output terminals 30 and 29 of the board 20. The resistors 153 and 142 may each have values of 1 kilohm. The negative excursion of the potential at the collector electrodes is limited by connections of the diodes 160 and 157 from the minus 12 volt terminal 28 of the board 20. The terminal 28 is coupled to the plus 2 volt terminal 26 by a capacitor 101 which may have a suitable value of 20 microfarads.

In this manner, responsive to the operation of the start multivibrator 25, the flip-flop 99 and the core 120 in the sign bit circuit 100 are set. The register clear pulse from the amplifier 93 is provided through terminal 22 of the board 20 and terminal 22 of the board 240 in FIGURE 3 to the ten diodes 132–1 through 132–10 of the ten stages 1–10 in the register 12. These diodes are connected respectively to the base electrodes of the transistors 144–1 through 144–10 so that the flip-flops 99–1 through 99–10 are reset. The register 12, accordingly, is cleared or reset and the sign bit circuit 100 is set responsive to the clear pulse from the start multivibrator 25.

As indicated above, when the start multivibrator 25 operates, it provides a pulse to trigger the adjacent delay multivibrator 26. The delay multivibrator 26, which may provide for a delay between 5 and 12 microseconds, triggers the multivibrator 27 which is referred to as the clamp drive multivibrator. The chain of multivibrators 25 through 28 in the control circuit 13 are successively operated by positive pulses. More particularly the delay multivibrator 26 is triggered by a positive pulse from the start multivibrator 25 and the delay multivibrator 27, in turn, is triggered by a positive pulse from the multivibrator 26. The capacitor 42 and the resistor 43 in the start multivibrator 25 function essentially as a differentiating circuit for developing a negative-going pulse at the initiation of operation of the multivibrator 25 and then a positive-going pulse which triggers the multivibrator 26 at the termination of the operation of the multivibrator 25. Similarly, the multivibrator 27 is triggered at the end of the operating interval of the multivibrator 26.

The multivibrator 27, which is the clamp drive multivibrator, provides a negative pulse during the time it is in its operating condition on the lead 27*a*, and at the termination of its operating condition it provides a positive pulse to trigger the delay multivibrator 28. The negative clamp drive pulse through lead 27*a* is provided through terminal 32 of the board 20 and terminal 17 of the board 220 to an amplifier 19 at the comparator 11. The clamp drive pulse is provided to the base circuit of an amplifier transistor 308 and, more particularly, through a resistor 306 shunted by a capacitor 307 to the base electrode of the transistor 308. The resistor 306 may have a suitable value such as 47 kilohms and the capacitor 307 may have a suitable value such as 100 microfarads. The emitter electrode of transistor 308 is coupled to the plus 2 volt terminal 26 of the board 220, and the collector electrode of the transistor 308 is biased over a path through a resistor 312 to the minus 12 volt terminal 28 of the board 220. The resistor 312 may have a suitable value such as 1.5 kilohms.

The amplifier transistor 308 functions to invert the pulse or provide for a phase reversal with a positive pulse appearing at its collector electrode. The positive pulse at the collector electrode of the transistor 308 is coupled through a diode 309 to reverse bias a diode 302 in the Schmidt trigger 17. The positive pulse also is coupled through a resistor 311 to the base electrode of an emitter follower transistor 316 causing it to become non-conductive. The collector electrode of the transistor 316 is connected by a resistor 313 to the minus 12 volt terminal 28 of the board 220. The resistors 311 and 313 may respectively have suitable values such as 5.6 kilohms and 1 kilohm. The base electrode of the transistor 316 is also connected by a resistor 310 to the plus 2 volt terminal 26 of the board 220. The resistor 310 may have a suitable value such as 5.6 kilohms. The potential at the emitter electrode of the transistor 316 is also positive responsive to the clamp drive pulse because phase reversal does not take place across the emitter follower. The positive potential at the emitter electrode of the transistor 316 together with the positive potential provided through the diode 309 function to reverse bias the diode 302 so that the potential at the base electrode of a transistor 301 in the trigger circuit 17 is not clamped.

In the absence of a clamp drive pulse from the multivibrator 27 in the control circuit 13, the diode 302 is forward biased due to the conductivity of the transistor 316. As described above, the collector electrode of the transistor 316 is connected to a minus 12 volt source so that when the transistor 316 is conductive, the diode 302 is forward biased to clamp the base electrode of the transistor 301 at a negative potential preventing its conductivity and therefore the operation of the trigger circuit 17.

The Schmidt trigger circuit 17 is a controlled flip-flop which triggers only responsive to input signals exceeding a predetermined value. When the diode 302 is reverse biased, the Schmidt trigger circuit 17 is triggered responsive to an input potential which is more positive than minus 50 millivolts. The range of the input potential provided to the trigger circuit 17, as is further hereinafter described, may be at any value between plus and minus 400 millivolts. For potentials that are more negative than minus 50 millivolts, the trigger circut 17 is not triggered or operated when the diode 302 is reverse biased.

The trigger circuit 17 includes the transistor 301, mentioned above, and also a second transistor 332 which are inter-connected in a trigger circuit arrangement. The base electrode of the transistor 322, which may be of the type designated GT1658, as well as the transistor 301, is connected to the collector electrode of the transistor 301 through a resistor 322 shunted by capacitor 324. The base electrode of the transistor 301, in turn, is connected to the collector electrode of the transistor 332 through a resistor 328 shunted by a capacitor 330. The resistors 332 and 328 may have suitable values such as 33 kilohms and 100 kilohms respectively, and the capacitors 324 and 330 may have suitable values such as 100 microfarads and 50 microfarads, respectively.

The emitter electrode of the transistor 332 is directly connected to the ground potential terminal 23 of the terminal board 220 and the emitter electrode of the transistor 301 is connected throught a rheostat 339 to the terminal 23. The rheostat 339, which may have a maximum resistance of 10 ohms is utilized to adjust the threshold of the Schmidt level at which the trigger circuit 17 is responsive. As described above, the rheostat 330 may be set so that potentials more positive than minus 50 millivolts function to trigger the circuit 17 when the diode 302 is reverse biased by the clamp drive pulse from the control circuit 13. The emitter electrode of the transistor 301 is also connected through a resistor 320 to the minus 12 volt terminal 28 of the board 220. The resistor 320 may have a suitable value such as 560 ohms. The transistor 301 in the circuit 17 is normally non-conductive and the transistor 332 is normally conductive. The transistor 301 remains non-conductive even though the diode 302 is reverse biased unless a potential is provided from an amplifier 16 which is more positive than minus 50 millivolts. A potential more negative than minus 50 millivolts, reverse biases the base-to-emitter junction of the transistor 301 so that the circuit 17 is not triggered.

Before proceeding with the description of the function of the trigger circuit 17, the amplifier 16 in the comparator 11, which amplifier was mentioned above, is first described. As briefly indicated above, a summing network is provided at the input of the amplifier 16 which includes resistive components 228 through 234. These resistive components terminate at a summing junction 225. For bi-polar applications, the plus 10 volt terminal 6 of the board 220 is connected by a conductor A through the rheostat 229 and a resistor 228 to the summing junction 225. For uni-polar applications, a connector B instead of connector A is utilized and a ground potential is provided through this path to the summing junction 225. In the illustration above for inputs between plus and minus 400 microvolts, the bi-polar connector A is utilized. The rheostat 229, which may have a suitable maximum value such as 2 kilohms, is the system zero adjustment rheostat and the resistor 228 may have a suitable value such as 99 kilohms.

The analog input, which is to be converted by the apparatus of this invention, is provided through the terminal 4 of the board 220 and a resistor 230 to the summing junction 225. The resistor 230 may have a suitable value such as 100 kilohms and this resistor determines the range of the system. For an illustrative magnitude of 100 kilohms, the input range for the analog input is between plus and minus 10 volts. The converter apparatus of this invention, accordingly, in the present illustration, functions to convert analog inputs between plus and minus 10 volts to a digital signal. In addition to these potentials provided to the summing junction 225, a sign bit potential is provided from the sign bit circuit 100 through terminal 2 of the board 220, a rheostat 233, a resistor 234, a rheostat 332 and a resistor 231 to the junction 225. The rheostat 233 may have a maximum value of 100 ohms and the resistor 234 may have a value of 4.95 kilohms. These two components function as a precision resistor for the sign bit circuit 100. The rheostat 233 functions to adjust the precision resistance because the sign bit is the most critical bit of the eleven bits of the binary signal developed from the analog input. The rheostat 233 is set to avoid a condition where one 0 and all 1's are provided by the converter. This setting is provided so that a complement of negative numbers can be provided. The rheostat 232 may have a maximum value of 2 kilohms and the resistor 231 may have a value of 6.5 kilohms. These components are connected from terminal 8 of the board 220 which is, in turn, coupled to the register 12 receiving the composite analog signal from the stages 1 through 11 of the register 12. The rheostat 232 is a full scale adjustment component. Two clamp diodes oppositely poled which are coupled from the junction 225 to the ground potential terminal 23 keep the range of potentials at the junction 225 in a narrow band. The potential at the junction 225 represents the sum of potentials related to the potentials provided at terminal 6 for 8 and 2 of the terminal board 220. More accurately, the potential represents the summing error of the analog inputs and the composite signal from the register 12 and the sign bit circuit 100. The resistor 231 determines the full scale input range of the converter apparatus of this invention, which as indicated above, may be between plus and minus 10 volts.

To recapitulate, the comparator 11 receives the analog input voltage, the sign bit voltage selected by the circuit 100 in the control circuit 13, and the voltage developed by the resistor matrix in the register 12. In addition, a bias voltage is added to these voltages to provide a summing error voltage at the junction 225. From this voltage, as amplified by the amplifier 16, the comparator 11 determines at the Schmidt trigger circuit 17 the need for a reset signal to reset the particular stage in the register 12 selected by the magnetic shift register including the cores 120-1 through 120-10. The operation of the magnetic shift register is further hereinafter described after the description of the amplifier 16.

The potential at the summing junction 225 is provided through the amplifier 16 which includes a D.C. amplifier section along the bottom left hand portion of FIGURE 2 and an A.C. amplifier section along the upper central portion of FIGURE 2. The potential at the junction 225 is coupled through a filtering arrangement including two capacitors 343 and 345 and two resistors 344 and 347 to a resistor 359 at the emitter electrode of a "chopper" transistor 360. The term "chopper" is utilized because the transistor 360 is pulsed at a relatively high frequency rate, illustratively 10 kilocycles, to "chop" the substantially D.C. signal from the junction 225. The resistors 344, 347 and 359 may have illustrative values of 2.2 kilohms, 22 kilohms and 2.2 kilohms respectively, and the capacitors 343 and 345 may each have a value of .033 micromicrofarad. The arrangement functions to filter the varying potential at the junction 225 so that sharp or rapid fluctuations are removed. The transistor 360 is pulsed at the 10 kilocycle rate due to a 10 kilocycle signal which is introduced from the general purpose power supply mentioned above in reference to FIGURE 1 at terminal 32 of the terminal board 220. The 10 kilocycle signal is introduced through terminal 32 to an amplifier 354.

The amplifier 354 includes a transistor 420 having its collector electrode coupled to the ground potential terminal 20, an emitter electrode coupled by a resistor 424 to the terminal 32 and a base electrode coupled to the junction between two resistors 422 and 426. The resistors 424, 422 and 426 may respectively have values of 82 kilohms, 10 kilohms and 47 kilohms. The amplified 10 kilocycle signal is provided through a shaping network including resistors 429 and 427 with the resistor 427 being shunted by a capacitor 428. The resistors 429 and 427 may have values of 82 kilohms and 10 kilohms, respectively, and the capacitor 428 may have a value of 220 microfarads. The amplified signal is coupled to the base electrode of the transistor 360 which was mentioned above. The collector electrode of the transistor 360 is connected to the ground potential terminals 20 and 21 through a resistor 361 which may have a value of 10 ohms. The transistor 360, accordingly, becomes conductive and non-conductive at the 10 kilocycle rate.

The potential at the emitter electrode of the transistor 360 is determined by the filtered analog signal from the junction 225. A series of pulses is, accordingly, developed at a 10 kilocycle rate, each of which has a magnitude determined by the instantaneous magnitude of the summing error signal at the junction 225. These pulses are coupled through a four-stage amplifier arrangement including four transistors 365, 374, 382 and 395. The signal is chopped and amplified in this manner because the variation of the input analog signal to the terminal 4 may be anywhere in a relatively large frequency range, illustratively, between 0 and 100 kilocycles.

The 10 kilocycle signal from the emitter electrode of the transistor 360 is coupled through a capacitor 366 to the base electrode of the transistor 365. The base electrode is connected by a resistor 367 to a diode 261 connected to the ground terminal 23. The resistor 367 may have a value of 15 kilohms and the capacitor 366 may have a value of .033 micromicrofarad. The collector electrode is biased from the minus 20 volt terminal 18 through a resistor 357 having a value of 10 kilohms and a resistor 368 having a value of 47 kilohms. The collector electrode is directly connected to the base electrode of the transistor 374. The emitter electrode of the transistor 365 is biased over a path from the plus 20 volt terminal 19 through a 10 kilohm resistor 375 and a 6.8 kilohm resistor 369. The resistor 369 is shunted by a capacitor 370 having a value of 100 microfarads. The emitter electrode is also coupled to ground through the series circuit including a resistor 371 and a capacitor 372. The resistor 371 may have a value of 100 ohms and the capacitor 372 may have a value of 4 micromicrofarads. The transistor 374 is an NPN transistor as is the transistor 395 whereas the transistors 365 and 382 are PNP type transistors. Illustratively, the transistors 374 and 395 may be of the type designated GT1658 and the transistors 365 and 382 may be of the type designated 2N404. The transistor 360, described above, may be of the type designated 2N393. The collector electrode of the transistor 374 is connected to the plus 20 volt terminal 19 through the resistor 375, mentioned above, The emitter electrode of the transistor 374 is connected directly to the ground terminals 20 and 21.

The amplified 10 kilocycle signal at the collector electrode of the transistor 374 coupled through a capacitor 378 having a value of .033 micromicrofarad to the base electrode of the transistor 382. The base electrode is connected by a resistor 380 to the diode 261 mentioned above. The resistor 380 may have a value of 15 kilohms. The collector electrode of the transistor 382 is biased over a path from the minus 20 volt terminal 18 through a resistor 384 having a value of 47 kilohms. The emitter electrode of the transistor 382 is biased over a path from the plus 20 volt terminal 19 through a resistor 394 and a resistor 386, the latter being shunted by a capacitor 388. Resistors 384 and 394 and 386 may have values of 2.2 kilohms and 6.8 kilohms, respectively, and the capacitor 388 may have a value of 100 microfarads. The emitter electrode of the transistor 382 is also connected by the series arrangement including a resistor 389 and a capacitor 390 to ground. The resistor 389 may have a value of 100 ohms and the capacitor 390 may have a value of 4 micromicrofarads. The amplified signal at the collector electrode of the transistor 382 is directly provided to the base electrode of the transistor 392. The emitter electrode of the transistor 392 is directly connected to ground and the collector electrode is biased over a path through the resistor 394.

The amplified 10 kilocycle signal is coupled from the collector electrode of the transistor 392 through a capacitor 395 having a value of .1 microfarad to a demodulator 355. The 10 kilocycle signal from the terminals 30 and 32 of the board 220 are introduced also to the demodulator 355 and the demodulator 355 functions to recover the varying signal which modulates the 10 kilocycle frequency signal. The demodulator 355 is of the balanced demodulator type with the 10 kilocycle signal to be demodulated being introduced respectively through resistors 396 and 400 to the emitter electrodes of two transistors 416 and 401. The transistor 416 may be of the type designated GT1658 and the transistor 401 may be of the type designated 2N404. The resistors 396 and 400 may each have a value of 3.3 kilohms. The base electrodes of the transistors 401 and 416 are connected by 1 kilohm resistors 409 and 417 respectively, to the ground terminal 20 of the board 220. The collector electrodes of the transistors 401 and 416 are interconnected and biased. The emitter electrode of the transistor 401 is connected by a resistor 408 having a value of 3.3 kilohms to the ground terminal and the emitter of the transistor 416 is connected by a resistor 414 to the minus 20 volt terminal 18. Resistor 414 may have a value of 120 kilohms.

The 10 kilocycle signal from the terminal 30 is coupled to the adjustable arm of the potentiometer 407, which is the amplifier zero potentiometer, having a maximum impedance across its end terminals of 20 kilohms. The collector electrode of the transistor 360 is connected to one end terminal of the potentiometer 407 and its other end terminal is grounded. The signal across the potentiometer 407 is introduced to the base electrode of the transistor 401 through a resistor 404 shunted by a capacitor 403. Resistor 404 may have a value of 3.9 kilohms and the capacitor 403 may have a value of 330 microfarads.

Similarly, the 10 kilocycle signal is also introduced from terminal 32 of the board 220 to the base electrode of the transistor 416 through a resistor 418 shunted by a capacitor 419. The resistor 418 and capacitor 419 may have similar values to resistor 404 and capacitor 403. The base electrodes in the transistors 401 and 416 are coupled to ground respectively through capacitors 410 and 411 having values of .005 microfarad. The base electrode of the transistor 401 is biased from the plus 20 volt terminal 19 of the board 220 through a resistor 412 having a value of 18 kilocycles.

In this manner, the amplified signal at a 10 kilocycle rate is introduced from the transistor 392 to the emitter electrodes of transistors 401 and 416; whereas, the 10 kilocycle signal from the general purpose power supply is introduced to the base electrodes of the transistors 401 and 416. The demodulated signal, which is a D.C. varying signal, is introduced from the collector electrodes of the transistors 401 and 416 through a filtering arrangement, which is hereinafter described, back to the A.C. portion of the amplifier 16 shown in the upper central portion of FIGURE 2. The summing error signal at the junction 225 is chopped and amplified for a greater amplification and D.C. stability. In this manner, drift is avoided through the amplifier.

The amplified D.C. signal from the demodulator 355 is provided to the filter arrangement including three capacitors 501, 502 and 504 and three resistors 500, 503 and 505. The capacitors 501, 502 and 504 may have values of .22 micromicrofarads, 8 microfarads and .033 microfarad; the resistors 500, 503 and 505 may have values of 220 ohms, 6.8 kilohms and 68 kilohms, respectively. The filtered D.C. signal is introduced through the base electrode of a transistor 258, which may be of the type designated 2N393. The summing junction 225 is connected by two capacitors 255 and 257, respectively, to the collector and base electrodes of the transistor 258. These capacitors may have suitable values such as 200 microfarads and .33 microfarad, respectively. The capacitor 257 is connected between the junction 225 and the base electrode of the transistor 258, and a feedback path is provided from the collector electrode of the transistor 258 through a resistor 256 and the capacitor 255 back to the junction 225. The resistor 256 may have a value of 330 ohms.

Biasing potential is provided to the collector electrode of the transistor 258 from the minus 20 volt terminal 18 through the resistor 357 and a resistor 342, having a value of 15 kilohms. The emitter electrode of the transistor 258 is connected to ground by the diode 261, which is mentioned above.

The output of the amplifying transistor 258 is directly coupled from its collector electrode to the base electrode of a transistor 304. The emitter electrode of the transistor 304 is connected to the ground terminal by a resistor 305 having a value of 100 ohms. The collector electrode of the transistor 304 is coupled by a resistor 274 to the base electrode of a transistor 272 which forms the third amplifying stage in the A.C. portion of the amplifier 16. The resistor 274 may have a value of 1 kilohm. The base electrode of the transistor 272 is biased from the minus 20 volt terminal 18 through a resistor 275 having a value of 2.2 kilohms. The emitter electrode of the transistor 272 is connected by a Zener diode to the minus 20 volt terminal 18. The Zener diode may be of the type designated 1N756. The collector electrode of the transistor 272 is coupled to a pair of transistors 268 and 282 which may be, respectively, of types GT1658 and 2N404. The base electrodes of the transistors 268 and 282 are connected by a diode 270 of the type designated 1N770, which diode is forward biased and functions to maintain substantially the same D.C. potential at the two base electrodes. The two transistors 268 and 282 form a composite emitter follower for the amplified signal from the stage 272.

A constant current is provided to the base electrodes of the transistors 268 and 282 from a transistor 265. Transistor 265 forms part of a current regulator and has its emitter electrode connected by a resistor 266 to the plus 20 volt terminal 19 of the board 220. The resistor 266 may have a value of 2.2 kilohms. The base electrode of the transistor 265 is connected by a Zener diode 264 to the plus 20 volt terminal 19 of the board 220. The terminal 19 of the board 220 is also connected by a resistor 263 to the diode 261 mentioned above and the diode 261 is shunted by a capacitor 262. The resistor 263 may have a value of 3.3 kilohms and the capacitor 262 may have a value of 200 microfarads. The collector electrode of the transistor 265 is directly connected to the base electrode of the transistor 268 mentioned above. The collector electrode of the transistor 268 is coupled to the base electrode of the transistor 265 and the collector electrode of the transistor 282 is connected by a resistor 303 to the ground terminal. The resistor 303 may have a value of 3.3 kilohms.

Two emitter electrodes of the transistors 268 and 282, respectively, are connected by resistors 283 and 285 to the Schmidt trigger circuit 17 described above. The resistors 283 and 285 may be 47 ohms each. The amplified output from the composite emitter follower stage is coupled across a voltage divider consisting of the resistors 287 through 289, also mentioned above. These resistors may have values of 8.25 kilohms, 250 ohms and 250 ohms, respectively. The junction between the resistors 288 and 289 is coupled as a feedback path back through a resistor 226 shunted by a capacitor 227 to the summing junction 225. Resistor 226, which may have a value of 24.9 kilohms, is a gain adjusting resistor, and the capacitor 227 may have a value of 20 microfarads. The feedback path through the resistor 226 is utilized for stability.

The gain of the amplifier 16 is approximately 10 but, if the potential at the output of the composite emitter follower exceeds in magnitude 400 microvolts, the gain is cut down to approximately 1 by the diodes 291 and 292 at the input of the trigger circuit 17. This avoids overloading the amplifier 16 so that large recovery times are avoided.

If the potential to the Schmidt trigger circuit 17 is more positive than minus 50 millivolts, the circuit 17 is operative during the time the clamp drive pulse is provided from the control circuit 13. If the analog input to the comparator 11 is positive between 0 and plus 10 volts, then the potential to the circuit 17 is more negative than minus 50 volts and the vircuit 17 is not triggered. Conversely, if the analog input is negative, the potential at this time is more positive than minus 50 millivolts and the circuit 17 is triggered. Assume for the moment that the analog input potential is negative so that the Schmidt trigger circuit 17 is triggered.

When the Schmidt trigger circuit 17 is triggered, a negative pulse is coupled from the collector electrode of the transistor 332, which becomes conductive, through a capacitor 334 and a diode 337 to a reset multivibrator including two transistors 315 and 318. The junction between the capacitor 334 and the diode 337 is connected to the junction between two resistors 335 and 338 coupled between the plus 10 volt terminal 27 and the ground terminals. The resistors 335 and 338 may have values of 39 kilohms and 6.8 kilohms, respectively, and the capacitor 334 may have a value of 200 microfarads. The diode 337 may be of the type designated 1N770, and the transistors 315 and 318, which form the reset multivibrator, may be of the type 2N404. The negative pulse from the trigger circuit 17 is introduced to the base electrode of the transistor 318 causing it to become conductive. The collector electrodes of the two transistors 318 and 315 are connected to the ground potential terminals, and the collector electrodes are biased over paths through the 1.2 kilohm resistors 574 and 319, respectively, from the minus 12 volt terminal 28. The collector electrode of the transistor 315 is connected through a resistor 572 having a value of 27 kilohms to the base electrode of the transistor 318. The resistor 572 is shunted by a capacitor 573 having a value of 200 microfarads which determines the duration of operation of the reset multivibrator. The collector electrode of the transistor 315, and the base electrode of the transistor 315 is connected to the minus 12 volt terminal 28, through a resistor 314 having a value of 22 kilohms.

When the reset multivibrator is triggered by the circuit 17, it provides a bit reset pulse to terminal 16 of the terminal board 220. This reset pulse is provided to each of the ten stages in the register 12 and also to the sign bit circuit 100 in the control circuit 13.

In the sign bit circuit 100, as described above, the magnetic core 120 is set at this time and the flip-flop 99 is also in its set condition. The magnetic core 120 in the circuit 100 is set during the first bit time of the eleven bits. The cores 120–1 and 120–10 are thereafter successively set during the successive bit times. The bit reset pulse from the reset multivibrator in the comparator 11 is introduced to terminal 11 of the terminal board 20. The bit reset pulse is introduced to an "and" gate including the resistor 128, a shunting capacitor 129 and a diode 126. The resistor 128 may have a value of 3.3 kilohms and the capacitor 129 may have a value of .001 microfarad. The magnetic core 120, as described above, is set by the amplifier 93 responsive to the operation of the start multivibrator 25. When the magnetic core 120 is set, it enables the "and" gate due to the connection of the output winding 121 to the diode 126. With the "and" gate enabled, the positive bit reset pulse from the comparator 11 is coupled through the "and" gate and a diode 130 to the base electrode of the transistor 144 in the flip-flop 99. This pulse causes the transistor 144 to become non-conductive reversing therefore the conductive condition of the transistors 144 and 145 in the flip-flop 99 so that the flip-flop 99 is reset. The magnetic core 120 in the sign bit circuit 100 remains in its set condition until a shift pulse is generated from a shift amplifier 80 shown in the upper right hand corner of FIGURE 4.

To recapitulate, the flip-flop circuit 99 is automatically set at the beginning of the converting operation responsive to the start pulse. The flip-flop circuit 99 is then reset during the first bit time if the input analog potential is negative. If the input analog potential is positive between 0 and plus 10 volts instead of between 0 and minus 10 volts, the Schmidt trigger circuit 17 in the camparator 11 is not triggered so that a bit reset pulse is not developed for resetting the flip-flop 99. The condition of the flip-flop 99, accordingly, indicates whether the input analog potential which is being converted is either positive or negative. The output of the flip-flop 99 is coupled through a resistor 138, at the collector electrode of the transistor 145, to the base electrodes of two transistors 135 and 136. These two transistors 135 and 136 form a compensation switch pair for introducing a potential to the terminal 2 of the board 220 in the comparator 11. The emitter electrodes of the transistors 135 and 136 are interconnected, the collector electrode of the transistor 136 is connected to terminal 23 of the board 20, and the collector electrode of the transistor 135 is connected to the minus 10 volt terminal 25 of the board 20. The resistor 138 may have a value of 1.5 kilohms. The output from the switch pair is taken from the interconnected emitters and provided through terminal 24 of the board 20 to terminal 2 of the board 220 in FIGURE 2.

As described above, the terminal 2 of the board 220 represents one input to the summing junction 225. Depending upon the condition of the flip-flop 99 in the sign bit circuit 100, one of two potentials is introduced through the rheostat 233 and the resistor 234 to the summing junction 225. In this manner, starting with the operation of the clamp drive multivibrator 27 in the control circuit 13, the sequence of operation is initiated for determining and controlling the condition of the flip-flop 99 in the sign bit circuit 100. As is hereinafter described, when the multivibrator 27 operates, it also in turn operates the multivibrator 28 to initiate a recirculation sequence of operations for successively controlling the operating condition of the flip-flops in the ten stages of the register 12. A cyclical operation is initiated for successively determining the condition of the different flip-flops in accordance with the input analog potential so that after a duration equivalent to a total of eleven bits, the register 12 and the sign bit circuit 100 are set to provide a digital representation of the input analog potential. This representation may be provided as an output in parallel and a serial output is developed as the successive bits of the digital number are developed.

When the multivibrator 28 is triggered, it provides a pulse to the shift amplifier 80 mentioned above. The pulse is coupled through a resistor 74 shunted by capacitor 75 to the base electrode of a transistor 77. The base electrode is also connected by a resistor 76 to the plus 2 volt terminal 26 of the board 20. The resistors 74 and 76 may have values of 270 ohms and 680 ohms, respectively, and the capacitor 75 may have a value of .0047 microfarad. The emitter electrode of the transistor 77 is coupled to ground and the shift pulse is taken from the collector electrode of the transistor 77 and provided to the shift winding 124 coupled to the magnetic core 120. The shift winding 124 causes the core 120 to reset and to provide a transfer pulse across the winding 122 which is provided through a diode 115 to a delay circuit 96. The delay circuit 96 includes an inductor 114, the opposite terminals of which are connected respectively by capacitors 112 and 113 to ground. The inductor may have a value of 470 microhenries and the two capacitors 112 and 113 may respectively have values of .0033 microfarad and .015 microfarad. The delayed pulse from the circuit 96 is provided to a transfer terminal 16 of the board 20. A pulse is also provided from the diode 115 to a bit set terminal 17 of the board 20. At the register 12, the bit set pulse is introduced through an "or" gate consisting of diodes 147–1 and 147*a*–1 to set the flip-flop 99–1. The flip-flop 99–1 and the flip-flops 99–2 through 99–10 are substantially similar to flip-flop 99 in the bit circuit 100 which was described above. For example, the flip-flop 99–1 includes two transistors 144–1 and 145–1 interconnected in the flip-flop arrangement. The flip-flop circuit 99–1 also includes two compensation switch transistors 135–1 and 136–1. The bit set pulse is coupled through the diode 147–1 to reverse the conductive conditions of the transistors 145–1 and 144–1 causing the flip-flop 99–1 to assume its set condition. This flip-flop is the only flip-flop in the register 12 which is in its set condition at this time. The transfer pulse from the delay circuit 96 is introduced to terminal 2 of the board 240 in the register 12. The transfer pulse is coupled through a resistor 170–1 to the winding 123–1 causing the core 120–1 also to assume its set condition. The resistor 170–1 may have a value of 220 ohms.

In this manner, responsive to the shift pulse developed from the amplifier 80 in control circuit 13, the magnetic core 120 is reset and the core 120–1 is set and the flip-flop 99–1 is also set. The magnetic cores 120 and 120–1 through 120–10 are connected in a shift register arrangement with successive shift pulses from the amplifier 80 advancing the set condition from one magnetic core to the next along the chain of magnetic cores. Further, as each magnetic core in the chain of the shift register is set, its associated flip-flop circuit is also set. Thereafter, depending upon the magnitude of the input analog potential, the respective flip-flop is either allowed to remain set or it is reset under control of the Schmidt trigger circuit 17 and the bit reset multivibrator.

When the multivibrator 28 is triggered in addition to developing the shift pulse, it also initiates the recirculation sequence for determining the next bit and it also develops serial clock pulses. As shown in FIGURE 4, the delay multivibrator is somewhat different than the start multivibrator 25 described above in detail. The multivibrator 28 includes two transistors 57 and 66 intercoupled in the multivibrator arrangement. The collector electrode of the transistor 58 is connected through a resistor 59 shunted by a capacitor 60 to the base electrode of the transistor 66. Various components in the multivibrator 28 may have similar values as the corresponding components in the start multivibrator 25. The emitter electrodes of the transistors 57 and 66 are connected to ground and the base electrodes are biased respectively through resistors 53 and 67. The collector elecrtode of the transistor 66 is connected through a resistor 68 and the primary winding of a transformer 65 to the minus 12 volt terminal 28. The serial clock pulses are developed across the transformer 65 and provided to the terminals 34 and 35 of the board 20. The secondary winding of the transformer 65 is shunted by a resistor 70 having a value of 5.6 kilohms. The resistor 68, mentioned above, has a value of 330 ohms. The upper terminal of the primary winding of the transformer 65 is connected to the minus 12 volt terminal and is shunted together with the resistor 68 by a diode 62 serially connected with the resistor 63. The resistor 63 may have a value of 2.7 kilohms. The serial clock pulses may be utilized for synchronization purposes at equipment associated with the converter apparatus of this invention.

As described above, in addition to developing the serial clock pulses and the shift pulses, the recirculation sequence is initiated by the multivibrator 28. A recirculation pulse is developed at the collector electrode of the transistor 66 which is provided to an "and" gate consisting of two diodes 581 and 582, a resistor 583 and a capacitor 580. The resistor 583 is connected between the junction of the two diodes 581 and 582 and the minus 12 volt terminal 28. The resistor 583 may have a value of 3.3 kilohms, and the capacitor 580 may have a value of 200 micromicrofarads. An enabling potential is normally provided to the diode 581 but this potential is removed when the last flip-flop, which is the flip-flop 99–10, is set. The recirculation pulse, accordingly, is coupled through the "and" gate to trigger the delay multivibrator 26. The recirculation pulse is provided through a connector 585 and a diode 44 to trigger the delay multivibrator 26. The junction between the connector 585 and capacitor 580 is connected to ground by a resistor 586 having a value of 5.6 kilohms.

The recirculation of successive bits may be externally controlled as well as automatically through the recirculation path just described. For the external control, connector 585 is not utilized and instead a connector 590, shown in phantom, is utilized. External clock pulses from equipment associated with the converter apparatus of this invention are introduced to terminals 5 and 6 of the board 20 and therefrom through a resistor 592 shunted by a capacitor 593 and a transformer 594 through the connector 590 to trigger the multivibrator 26. The resistor 592 may have a value of 3.3 kilohms and the capacitor 593 may have a value of 500 micromicrofarads. In the present illustration, the connector 585 is utilized and not the connector 590 so that automatic recirculation for the successive bits is utilized. When the delay multivibrator 26 is triggered, it initiates the sequence of operations for the next bit which is identical to that described above for the sign bit.

During each circulation of the multivibrators 26 through 28, the condition of another one of the flip-flops 99–1 through 99–10 is determined under control of the comparator 11. In this manner, the converter, by successive approximations, develops a binary signal representing the polarity and magnitude of the input analog voltage.

The stages 1 through 10 of the register 12 are, in this manner, successively controlled to provide the predetermined discrete potentials to the summing circuit in the comparator 11. After the stage 10 is set, the next shift pulse develops an "end of conversion" pulse. The pulse is developed at the winding 122–10 and coupled through the diode 115–10 and the delay circuit, including the capacitors 112–10 and 113–10, and the inductor 114–10. The pulse is provided through terminal 1 of the terminal board 240 to terminal 33 of the terminal board 20 in the control circuit 13. The pulse is amplified at a transistor 200, passing through a 22 kilohm resistor 198 shunted by a 0.01 microfarad capacitor 199, to the base electrode of the transistor 200. The base electrode is also connected by a 680 ohm resistor 196 to the minus 12 volt terminal 28. The emitter electrode is grounded, and the collector electrode is biased over a path from the plus 20 volt terminal 19 of the board 20 through a 560 ohm resistor 207, the primary winding of a transformer 206 and a 150 ohm resistor 201. A 560 ohm resistor 202 and a diode 204 shunt the resistor 201 and the primary winding.

The resistor 207 forms a voltage divider with a resistor 208 shunted by a capacitor 210. The resistor 208 has a value of 1.2 kilohms and the capacitor 210 has a value of 0.1 microfarad. A standard pulse is developed across the secondary winding of the transformer 206 when the transistor 200 is operated by the end of conversion pulse. The secondary winding is shunted by a 5.6 kilohm resistor 209. The amplified pulse is provided from the transformer 206 to terminals 3 and 2 of the board 20 which are connected to external circuits, not shown. An indication is, accordingly, provided at the end of the conversion of the analog input to an eleven bit binary signal.

The recirculation of the multivibrators 26 through 28 is inhibited at the "and" gate including the diodes 581 and 582 in FIGURE 4. This "and" gate was described above. The "and" gate is disabled when the flip-flop 99–10 in the last stage 10 of the register 12 is set. An inhibit pulse is developed at the collector electrode of the transistor 144–10 and provided through terminal 33 of the board 240 and terminal 4 of the board 240. In this manner, when the last stage 10 of the register 12 is set, an end of conversion pulse is developed and the recirculation is halted.

The eleven flip-flops 99 and 99–1 through 99–10 are set in conditions representing the respective binary digits of the eleven bit number. The eleven bits are provided serially during the conversion from the amplifier 92 to terminals 10 and 9 of the board 20. The eleven bits may also be read out in parallel at the end of the conversion interval. In FIGURE 3, the outputs from the flip-flops 99–1 through 99–10 are brought out to the terminal board 240 so that they may be simultaneously read. Set terminals are also provided to each flip-flop for selectively controlling them with external signals if so required.

The timing sequence in the converter is quite flexible due to the utilization of a shift register. The shift pulses may be developed under control of external clock pulses as well as automatically responsive to each recirculation of the multivibrators 26 through 28. The utilization of the magnetic shift register, moreover, considerably reduces the number of required components for each register stage so that a highly reliable apparatus is provided. A separate clearing interval is not required because the first bit, which is the sign bit, is determined at the same time the converter is cleared.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Apparatus for converting analog signals to digital signals, including, a first register having a plurality of flip-flops, a resistor matrix coupled to said flip-flops for providing a discrete voltage in accordance with the composite operating conditions of said flip-flops of said register, a magnetic shift register having a plurality of stages individually associated with the flip-flops of said first register, means coupled to the shift register and responsive to the operation of any stage of the shift register for enabling a reset operation for the flip-flop associated with said operated stage, cyclically operating circuitry for generating pulses and for shifting the operation from one stage of the magnetic shift register to the next, means coupled to said resistor matrix for comparing the discrete voltage provided therefrom with the analog signal to be converted, means coupled to said comparing means and responsive to a difference between said discrete voltage and the analog signal which exceeds a predetermined value for resetting the flip-flop associated with the operated stage of said shift register, means coupled to said shift register for setting the flip-flop associated with any one of the stages when said one stage is set, and means coupled to the last stage of the magnetic shift register and responsive to the operation of said last stage for disabling said cyclically operating circuitry.

2. Apparatus for converting analog signals to digital signals, including, a shift register having a plurality of stages, a flip-flop associated with each stage of said shift register, means for successively operating said shift register and said flip-flops associated with the stages of said shift register, means coupled to said flip-flops for successively developing discrete voltages in accordance with the composite operating conditions of said flip-flops, means coupled to said developing means for successively comparing the discrete voltages from said developing means with an analog signal to be converted, means coupled to said comparing means and responsive to a particular relationship between each of the discrete voltages and the analog signal to be converted for resetting the one of said flip-flops just operated before the comparison is made, said comparing means including trigger circuit means responsive to a difference between each discrete voltage and said analog signal which exceeds a predetermined value for resetting the flip-flop associated with the operated stage of said shift register, and gating means for enabling the operation of said trigger circuit means for a brief interval during the operation of each stage of said shift register; means coupled to said gating means and to said shift register for synchronizing the operation of said gating means with said shift register, means effective at the beginning of the conversion of an analog signal to a digital signal for setting a first one of the stages of said shift register; and means effective when said first stage is set for resetting all of said flip-flops except said flip-flop associated with said first stage.

3. Apparatus for converting analog signals to digital signals, including, a plurality of control multivibrators for developing control signals, normally enabled gating means, and means connecting said plurality of control multivibrators and said gating means in a closed loop so that the multivibrators successively and cyclically operate as long as the gating means remains enabled, a shift register having a plurality of stages and responsive to successive control signals from one of said control multivibrators for successively operating said stages, a bistable register circuit associated with each stage of said shift register and having a set and a reset condition, means coupled to said shift register for operating each bistable register circuit to its set condition when its associated stage of said shift register is operated, and a start circuit for simultaneously initiating the cyclic operation of said control multivibrators and for operating all of said bistable circuits except said bistable circuit associated with the first stage of said shift register to their reset conditions.

4. Apparatus for converting analog signals to digital signals in accordance with claim 3, wherein said start circuit includes means for operating said first stage and for operating said bistable circuit associated with said first stage to its set condition, and wherein the apparatus includes in addition, means responsive to the operation of the last stage of said shift register for disabling said gating means and for providing an indication of the end of the conversion.

5. Apparatus for converting analog signals to digital signals, including, a plurality of control multivibrators for developing control signals, normally enabled gating means, and means connecting said plurality of control multivibrators and said gating means in a closed loop so that the multivibrators successively and cyclically operate as long as the gating means remains enabled, a shift register having a plurality of stages and responsive to successive control signals from one of said control multivibrators for successively operating said stages, a bistable register circuit associated with each stage of said shift register and having a set and a reset condition, means coupled to said shift register for operating each bistable register circuit to its set condition when its associated stage of said shift register is operated, a start circuit for simultaneously initiating the cyclic operation of said control multivibrators and for operating all of said bistable circuits except said bistable circuit associated with the first stage of said shift register to their reset conditions, said start circuit including means for operating said first stage and for operating said bistable circuit associated with said first stage to its set condition, matrix means coupled to said bistable circuits for developing a discrete voltage in accordance with the composite operating conditions of said bistable circuits, means coupled to said developing means for successively comparing the discrete voltages from said developing means with an analog signal to be converted, and means coupled to said comparing means and responsive to a particular relationship between each of the discrete voltages and the analog signal to be converted for operating to its reset condition the one of said bistable circuits associated with the operated one of said stages at the time of the comparison by said comparing means.

6. Apparatus for converting analog signals to digital signals in accordance with claim 5, including in addition, means responsive to the successive control signals from another one of said control multivibrators for successively operating said comparing means whereby the operation of said comparing means is synchronized with the operation of said shift register, and means responsive to the operation of the last stage of said shift register for disabling said gating means and for providing an indication of the end of the conversion.

7. Apparatus for converting analog signals to digital signals in accordance with claim 6, wherein said comparing means includes trigger circuit means responsive to a difference between each discrete voltage and said analog signal which exceeds a predetermined value for operating the bistable circuit associated with the operated stage to its reset condition, and gating means controlled by said control signals from said another control multivibrator for enabling the operation of said trigger circuit means for a brief interval during the operation of each stage of said shift register.

8. The combination set forth in claim 5, including, means responsive to the operation of the last stage of the shift register for disabling the gating means and for providing an indication of the end of the conversion.

References Cited by the Examiner

UNITED STATES PATENTS 2,997,704 8/61 Gordon et al. ---------- 340—347

OTHER REFERENCES

Pages 137 and 138, December 1959, Analog-Digital-Analog Sign Handling, by W. P. Margopoulos and R. V. Mazza, "IBM Technical Disclosure Bulletin."

Pages 113–117, February 1954, Multi-Channel Analog-Digital Conversion System for D.-C. Voltages, W. S. Shockency, Joint Computer Conference 2nd Western, Los Angeles, Calif.

MALCOLM A. MORRISON, *Primary Examiner.*

UNITED STATES PATENT OFFICE

CERTIFICATE OF CORRECTION

Patent No. 3,182,304 May 4, 1965

Robert M. Beck et al.

It is hereby certified that error appears in the above numbered patent requiring correction and that the said Letters Patent should read as corrected below.

Column 5, line 50, for "resignations" read -- designations --; column 7, line 13, for "microfards" read -- microfarads --; column 9, line 3, for "conductor" read -- connector --; column 11, line 74, for "microfarad" read -- micromicrofarad --; column 13, line 39, for "vircuit" read -- circuit --; column 14, line 37, for "camparator" read -- comparator --.

Signed and sealed this 18th day of January 1966.

(SEAL)

Attest:

ERNEST W. SWIDER

Attesting Officer

EDWARD J. BRENNER

Commissioner of Patents